US012729966B2

(12) United States Patent
Wheeler

(10) Patent No.: US 12,729,966 B2
(45) Date of Patent: Sep. 8, 2026

(54) HIGH DEFINITION MAP BASED LOCALIZATION OPTIMIZATION

(71) Applicant: NVIDIA Corporation, Santa Clara, CA (US)

(72) Inventor: Mark Damon Wheeler, Saratoga, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 1053 days.

(21) Appl. No.: 17/375,213

(22) Filed: Jul. 14, 2021

(65) Prior Publication Data

US 2022/0042805 A1 Feb. 10, 2022

Related U.S. Application Data

(63) Continuation of application No. 16/208,026, filed on Dec. 3, 2018, now abandoned.

(Continued)

(51) Int. Cl.
*G01C 21/00* (2006.01)
*G01C 21/32* (2006.01)

(Continued)

(52) U.S. Cl.
CPC ......... *G01C 21/32* (2013.01); *G01C 21/3602* (2013.01); *G01C 21/3815* (2020.08);

(Continued)

(58) Field of Classification Search
CPC ...... G01C 21/32; G05D 1/0246; G05D 1/027; G05D 1/0274; G05D 1/0278
See application file for complete search history.

(56) References Cited

U.S. PATENT DOCUMENTS 9,612,343 B1 * 4/2017 Martin .................... G01S 19/49
9,731,729 B2 8/2017 Solyom et al.

(Continued)

FOREIGN PATENT DOCUMENTS

CN 104925053 A 9/2015
CN 106352867 A 1/2017
EP 3 156 873 A1 4/2017

OTHER PUBLICATIONS

CN Office Action dated Feb. 9, 2023 as received in Application No. 201880088229.1.

(Continued)

*Primary Examiner* — Aaron G Cain
(74) *Attorney, Agent, or Firm* — Sanders IP Law

(57) ABSTRACT

A vehicle, for example, an autonomous vehicle performs localization to determine the current location of the vehicle using different localization techniques as the vehicle drives. The localization technique used by the autonomous vehicle is selected from a localization variant index that stores mapping from a driving context to localization variant, each localization variant identifying a localization technique. The driving context may comprise information including: a geographical region in which the autonomous vehicle is driving, a speed at which the autonomous vehicle is driving, an angular velocity of the autonomous vehicle, or other information. Using an optimal localization technique in each driving context improves the accuracy of localization as well as computing efficiency of the process of localization.

20 Claims, 13 Drawing Sheets

Related U.S. Application Data

(60) Provisional application No. 62/593,334, filed on Dec. 1, 2017.

(51) Int. Cl.
*G01C 21/36* (2006.01)
*G05D 1/00* (2024.01)

(52) U.S. Cl.
CPC ..... *G01C 21/3867* (2020.08); *G01C 21/3878* (2020.08); *G01C 21/3881* (2020.08); *G05D 1/0246* (2013.01); *G05D 1/027* (2013.01); *G05D 1/0274* (2013.01); *G05D 1/0278* (2013.01)

(56) References Cited

U.S. PATENT DOCUMENTS

| | | | | |
|---|---|---|---|---|
| 11,125,566 | B2 | 9/2021 | Cui et al. | |
| 2008/0140318 | A1 | 6/2008 | Breed | |
| 2009/0192709 | A1 | 7/2009 | Yonker et al. | |
| 2009/0262974 | A1 | 10/2009 | Lithopoulos | |
| 2010/0255856 | A1 | 10/2010 | Kansal et al. | |
| 2014/0022121 | A1* | 1/2014 | Donovan | G01S 19/49 342/357.49 |
| 2014/0073349 | A1* | 3/2014 | Schunk | H04W 64/003 455/456.1 |
| 2015/0233720 | A1* | 8/2015 | Harada | G06V 20/56 701/409 |
| 2017/0016740 | A1* | 1/2017 | Cui | G01C 21/30 |
| 2017/0108867 | A1 | 4/2017 | Franzius et al. | |

OTHER PUBLICATIONS

PCT International Search Report and Written Opinion, PCT Application No. PCT/US2018/063629, Feb. 26, 2019, 26 pages.

European Search Report issued in corresponding application No. 18883081.4, dated Aug. 16, 2021.

* cited by examiner

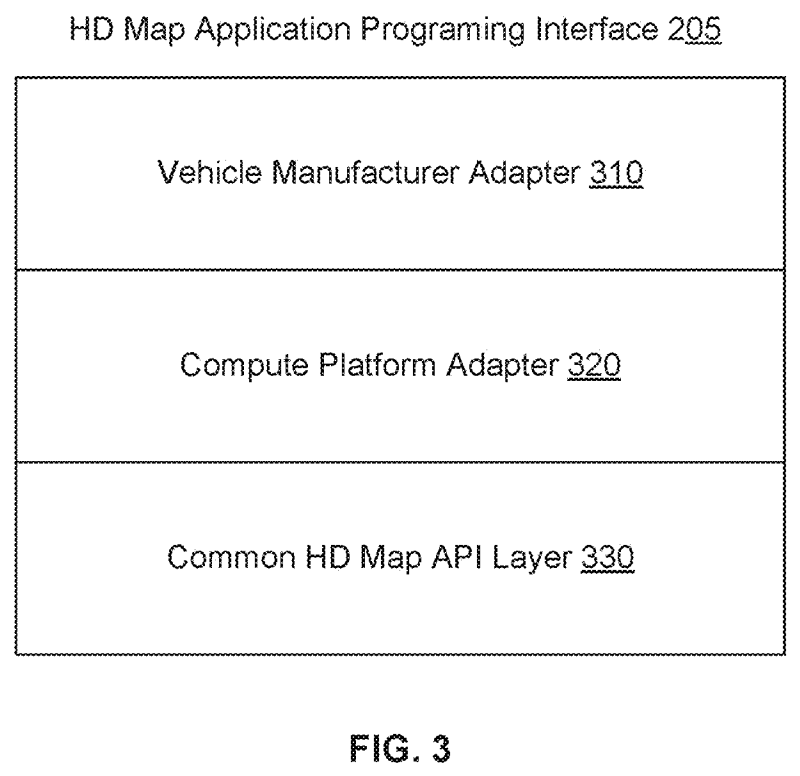

HD Map Application Programing Interface 205

Vehicle Manufacturer Adapter 310

Compute Platform Adapter 320

Common HD Map API Layer 330

FIG. 3

HIGH DEFINITION MAP BASED LOCALIZATION OPTIMIZATION

CROSS-REFERENCE TO RELATED APPLICATION

This application is a continuation of U.S. patent application Ser. No. 16/208,026, filed on Dec. 3, 2018, which claims priority to U.S. Provisional Application No. 62/593,334 filed on Dec. 1, 2017, the disclosures of each of which are hereby incorporated herein by this reference in their entireties.

BACKGROUND

This disclosure relates generally to localization of autonomous vehicles and more particularly to optimization of localization strategies used by an autonomous vehicle based on a driving context, for example, the geographical region in which the autonomous vehicle is driving, the time of day, the speed of the autonomous vehicle, and so on.

Autonomous vehicles, also known as self-driving cars, driverless cars, auto, or robotic cars, drive from a source location to a destination location without requiring a human driver to control and navigate the vehicle. Autonomous vehicles need to determine their location accurately to be able to navigate. Autonomous vehicles use sensor data to determine their location. There are several techniques that can be used for determining the location of an autonomous vehicle. These techniques may depend on the type of sensor data used for determining the location, for example, camera images, lidar scans, global positioning system (GPS) data, inertial measurement unit (IMU) data, and so on.

Certain localization technique may work better in certain circumstances whereas a different technique may work better in other circumstances. For example, a localization technique based on lidar signal may work better in some circumstances whereas a localization techniques based on global positioning system (GPS) and inertial measurement unit (IMU) may work better under different circumstances. Similarly, on a street with houses or buildings and trees, geometric lidar-based localization may perform very well. However, on a highway with no interesting vertical geometry, that same localization technique may fail to identify the forward location or the yaw angle of the autonomous vehicle.

The performance of a localization technique depends on various factors for example, the type of sensor data available, type of terrain, type of signal available, whether the vehicle is driving in city or on highway, whether there is a truck driving next to the vehicle occluding the view on the side, and so on. The localization must be performed periodically at a high frequency to allow the autonomous vehicle to navigate properly.

Conventional systems use a particular localization technique that may fail as the factors controlling the accuracy of the localization technique change. A localization technique that works well in one geographical region may not work well in another geographical region, for example, it may take significantly longer to process or have low accuracy. Furthermore, localization techniques have parameters that need to be tuned for different driving contexts. Parameters that work well in one geographical region may not work well in another geographical region. If the localization process fails, the autonomous vehicle may not be able to navigate properly.

SUMMARY

Embodiments of the invention perform localization of autonomous vehicles using different localization techniques as the autonomous vehicle drives. The localization technique used by the autonomous vehicle is selected using a localization variant index that stores a mapping from driving contexts to localization variants. A localization variant identifies a localization technique and values of one or more parameters associated with the localization technique. Examples of localization techniques include: a localization technique based on camera images, a localization technique based on lidar scans, a localization technique based on GNSS data, and a localization technique based on IMU data. There can be multiple localization variants based on the same localization technique, for example, different localization variants corresponding to different values of parameters for the same localization technique. The driving context comprises information describing one or more of: a geographical region in which the autonomous vehicle is driving, a time of day when the autonomous vehicle is driving, information describing weather conditions in the geographical region in which the autonomous vehicle is driving at the time the autonomous vehicle is driving, a speed at which the autonomous vehicle is driving, or an angular velocity of the autonomous vehicle.

The system stores a plurality of localization variants. Each localization variant represents a localization technique for determining location of an autonomous vehicle. The system also stores information describing a plurality of driving contexts. A driving context may be represented as a tuple that has various elements such as geographical region, time of day, weather condition, speed of autonomous vehicle, angular velocity of the autonomous vehicle, and so on. The system builds a localization index that maps driving contexts to localization variants. The system maps each driving context to one or more localization variants based on a measure of performance of the localization variants in the driving context. In an embodiment, the system stores a plurality of localization variants for each sensor modality. A sensor modality corresponds to a type of sensor input used by the localization variants, for example, localization variants based on lidar scans represent a sensor modality, localization variants based on cameras represent another sensor modality, and so on. Accordingly, the vehicle computing system selects a particular sensor modality for use and selects one or more localization variants for the sensor modality for localization. In one embodiment, the vehicle computing system determines measures of confidence in localization variants and measures of covariances across localization variants using different sensors. The vehicle computing system integrates results of localization variants from different sensor modalities using Kalman filtering. The integration of localization variants based on Kalman filtering uses the measures of confidence values and measures of covariance values.

An autonomous vehicle uses the localization index while driving as follows. The autonomous vehicle receives sensor data captured by sensors of the autonomous vehicle. The autonomous vehicle uses the sensor data to determine a driving context in which the autonomous vehicle is currently driving. For example, the autonomous vehicle may determine an approximate location based on the sensor data and determine a geographical region based on the approximate location. The autonomous vehicle selects one or more localization variants corresponding to the driving context using the localization index. The autonomous vehicle determines a location of the autonomous vehicle using the selected localization variants and uses the location for navigation of the autonomous vehicle. These steps are repeated as the autonomous vehicle drives.

In an embodiment, the system builds the localization index as follows. The system repeats the following steps for each driving context. For each of the plurality of localization variants, the system determines a measure of performance of the localization variant. The system ranks the localization variants based on the measure of performance. The system selects one or more localization variants for the driving context based on the ranking and stores an association between the driving context and the selected localization variants in the localization index.

The measure of performance of a localization variant in a particular driving context may be determined based on one or more factors including: an error in localization using the localization variant in the driving context, a time of execution of the localization variant in the driving context, or a rate of success of the localization variant in the driving context. A localization variant is successful if it determines the location of the autonomous vehicle within a threshold of an accurate location value.

In an embodiment, the system stores representation of geographical regions, for example, as polygons. The localization index maps geographical regions to localization variants. An autonomous vehicle determines the geographical region in which the autonomous vehicle is currently driving. The autonomous vehicle selects one or more localization variants corresponding to the geographical region and uses them for localization.

In an embodiment, the system stores representations of lane elements, each lane element corresponding to a portion of a lane of a street (or highway, road, etc.). The localization index maps lane elements to localization variants. An autonomous vehicle determines the lane element in which the autonomous vehicle is currently driving. The autonomous vehicle selects one or more localization variants corresponding to the lane element and uses them for localization.

In an embodiment, the system maps coordinates of locations, for example, latitudes and longitudes, to localization variants. An autonomous vehicle determines the current coordinates of the autonomous vehicle, for example, using GPS data or IMU data. The system identifies the nearest coordinates stored in the localization variant index for which localization variants are stored. The system uses the localization variants stored in association with the nearest coordinates to the location of the autonomous vehicles for performing localization.

Although embodiments are described in connection with autonomous vehicles, the techniques described herein can be used by other types of vehicles, for example, vehicles that are driven by human drivers. Furthermore, embodiments of the invention may be used for other types of navigable machines, for example, robots, ships, drones, airplanes, and the like.

BRIEF DESCRIPTION OF THE DRAWINGS

FIG. 3 illustrates the various layers of instructions in the HD Map API of a vehicle computing system, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Embodiments generate and maintain high definition (HD) maps that are accurate and include the most updated road conditions for safe navigation.

An autonomous vehicle that uses the HD map needs to localize, i.e., determine the current location of the autonomous vehicle with high accuracy to be able to navigate. The HD map system supports a number of localization techniques and variations of each localization technique. The performance of a localization technique may depend on various factors, for example, the scene surrounding the autonomous vehicle including the geometry of structures around the autonomous vehicle, identifiable photometric features, and so on. Embodiments of the invention select an appropriate localization technique and parameters tuned for the specific context to perform localization efficiently and accurately. The combination of a localization technique and corresponding parameter values is referred to as a localization variant. The HD map system estimates the performance of each localization variant for different contexts and uses an index to efficiently look up the best localization variants based on the current location of the autonomous vehicle. The HD map system also manages the lifetime of the map and localization variants by managing versions of the localization variants which correspond to versions of the executable files running on autonomous vehicle as well as versions of the HD map data.

Figure 1:
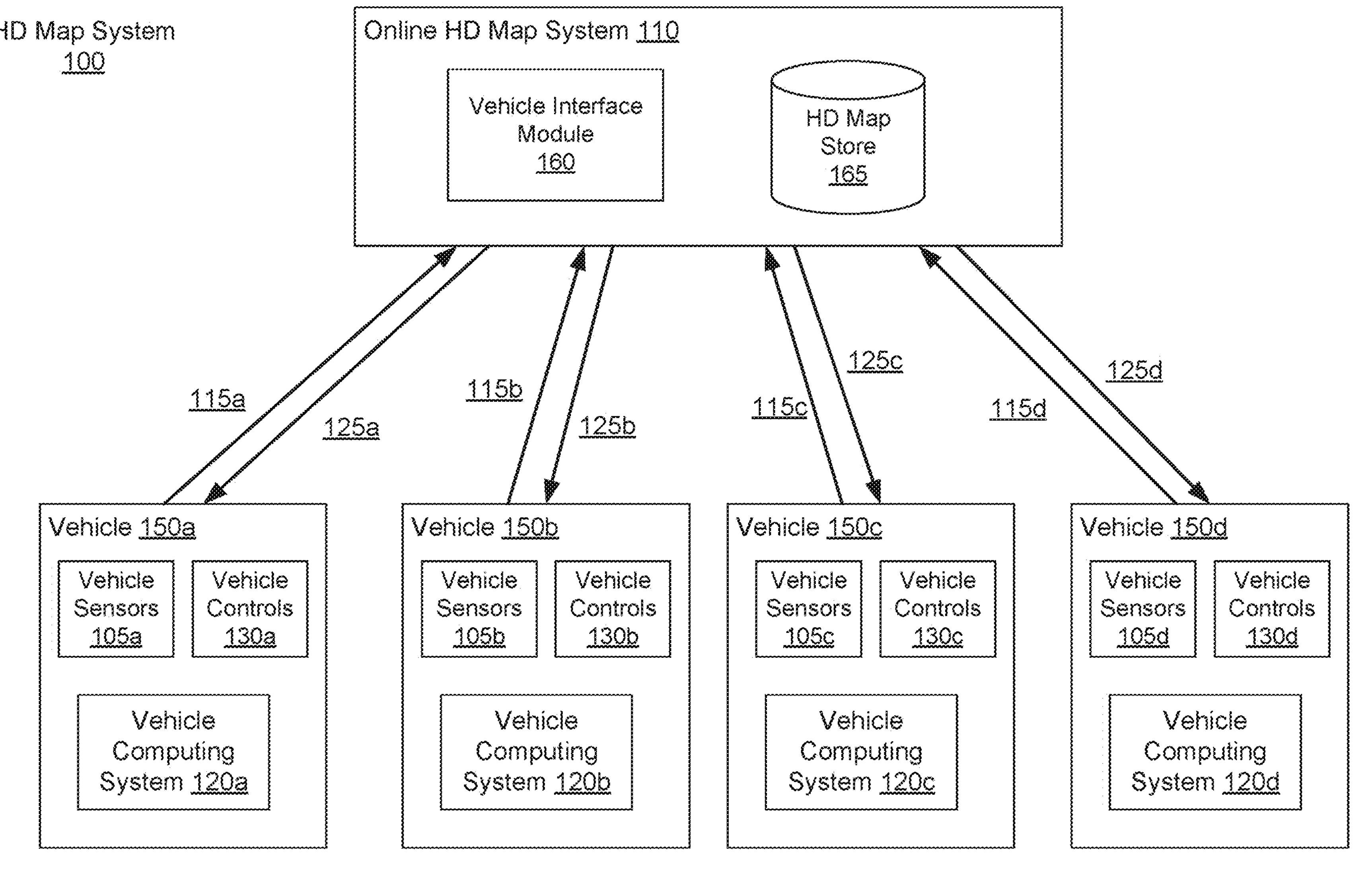
FIG. 1 shows the overall system environment of an HD map system interacting with multiple vehicle computing systems, according to an embodiment.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
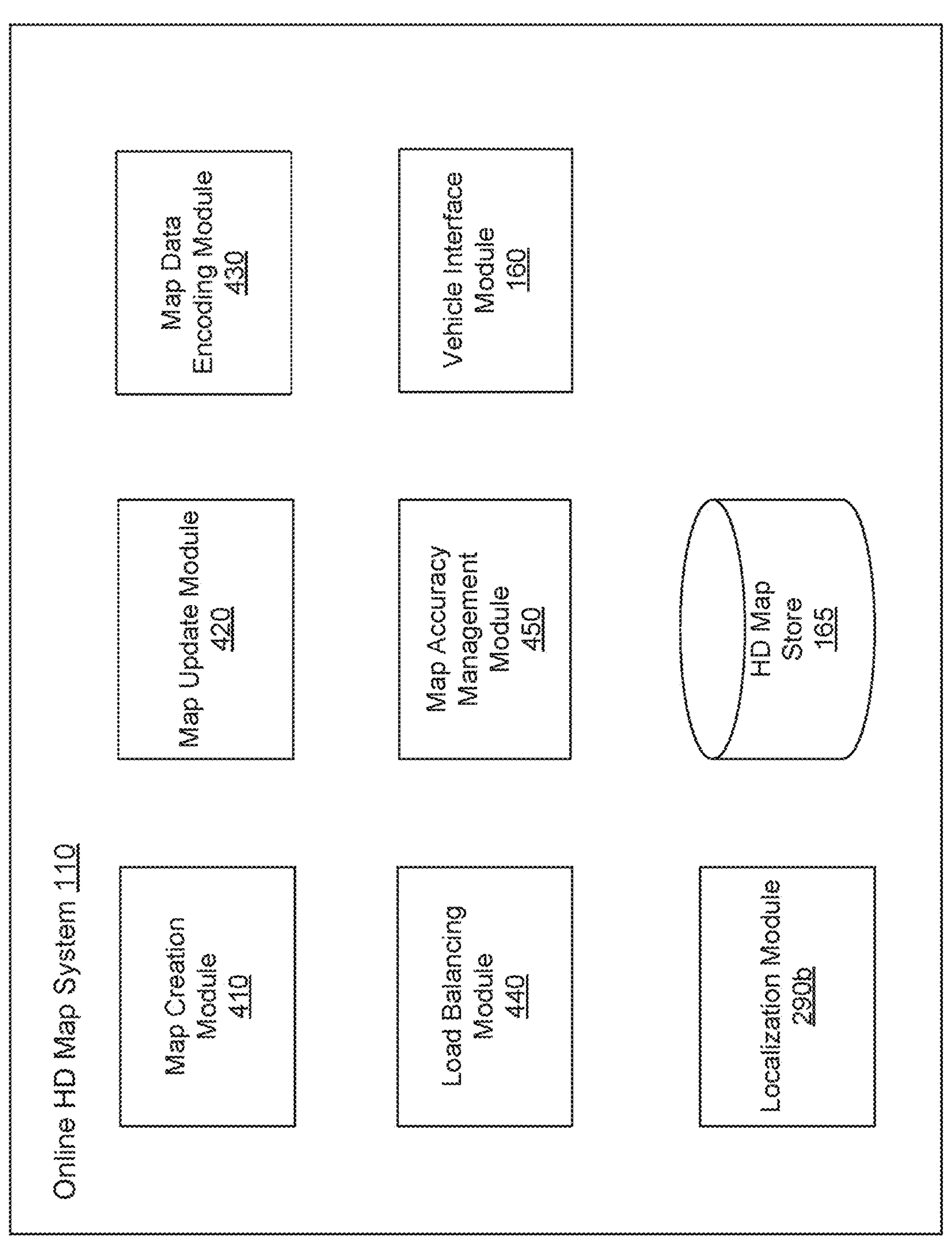
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the location of the vehicle based on signals from satellites. The position of the vehicle may also be referred to as the location of the vehicle. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
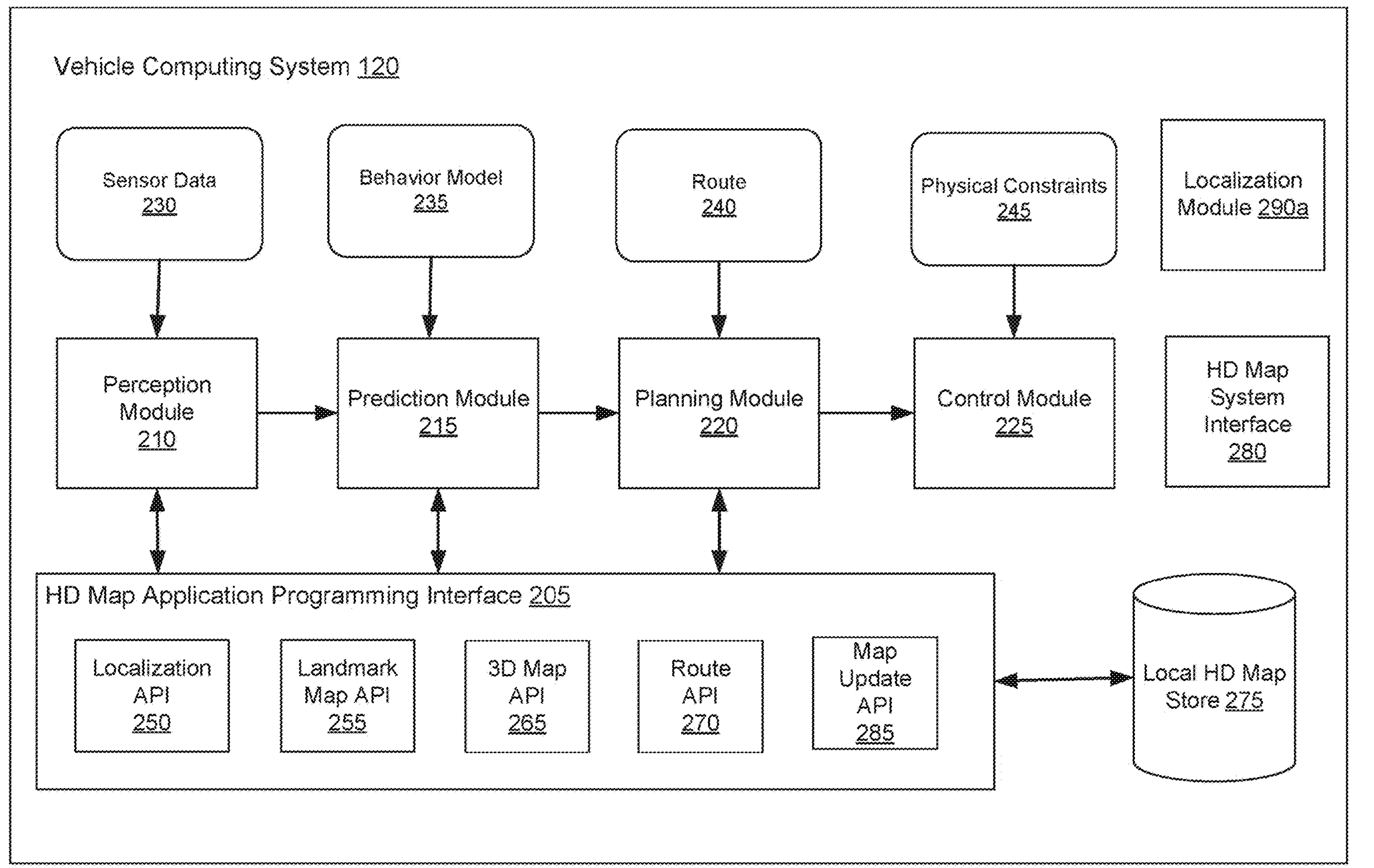
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a localization module 290*a*, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The localization module **290*a* performs localization for an autonomous vehicle. Details of the localization module 290** are further described herein.

FIG. 3 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, a HD map store 165, and the localization module 290. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
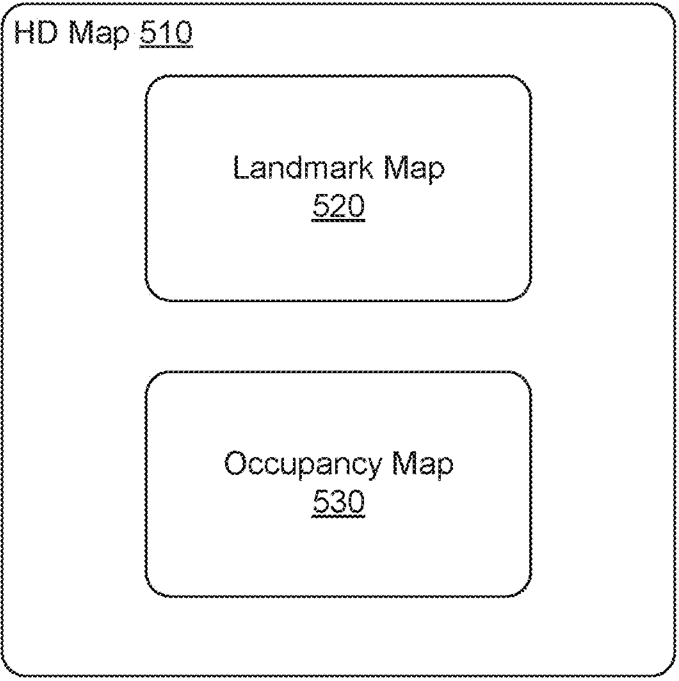
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4\times10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
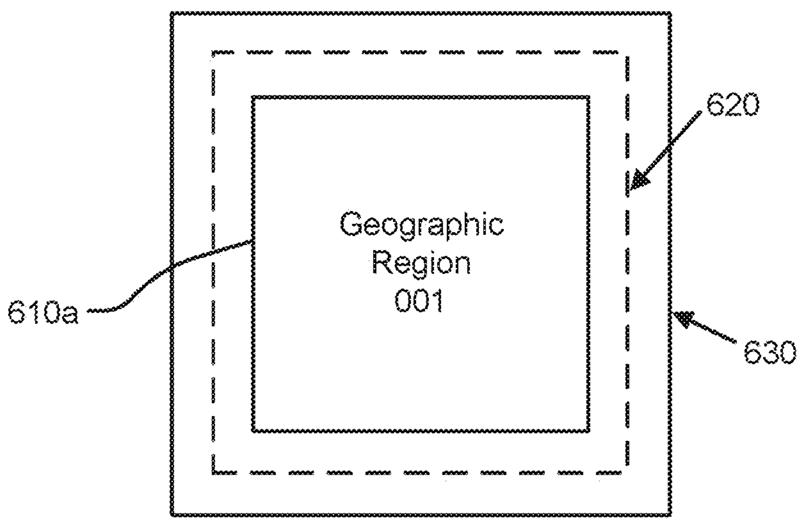
FIGS. 6A-B illustrate geographical regions defined in an HD map, according to an embodiment.
Figure 6B:
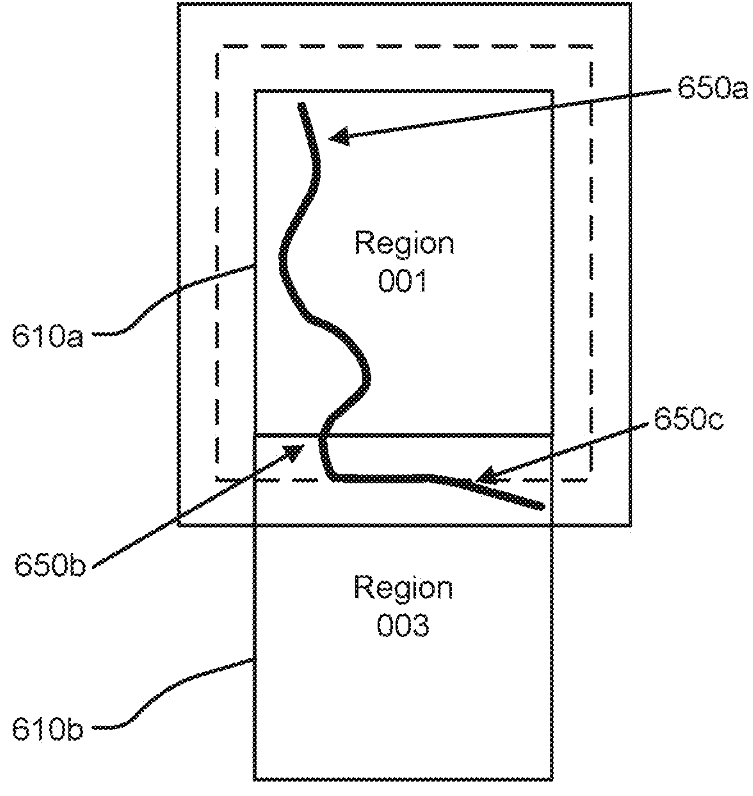

FIGS. 6A-B illustrate geographical regions defined in an HD map, according to an embodiment. FIG. 6A shows a square geographical region 610*a*. FIG. 6B shows two neighboring geographical regions 610*a* and 610*b*. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610*a* and a boundary 630 for buffer of 100 meters around the geographic region 610*a*. The vehicle computing system 120 switches the current geographical region of a vehicle from one geographical region to the neighboring geographical region when the vehicle crosses a threshold distance within this buffer. For example, as shown in FIG. 6B, a vehicle starts at location 650*a* in the geographical region 610*a*. The vehicle traverses along a route to reach a location 650*b* where it cross the boundary of the geographical region 610 but stays within the boundary 620 of the buffer. Accordingly, the vehicle computing system 120 continues to use the geographical region 610*a* as the current geographical region of the vehicle. Once the vehicle crosses the boundary 620 of the buffer at location 650*c*, the vehicle computing system 120 switches the current geographical region of the vehicle to geographical region 610*b* from 610*a*. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
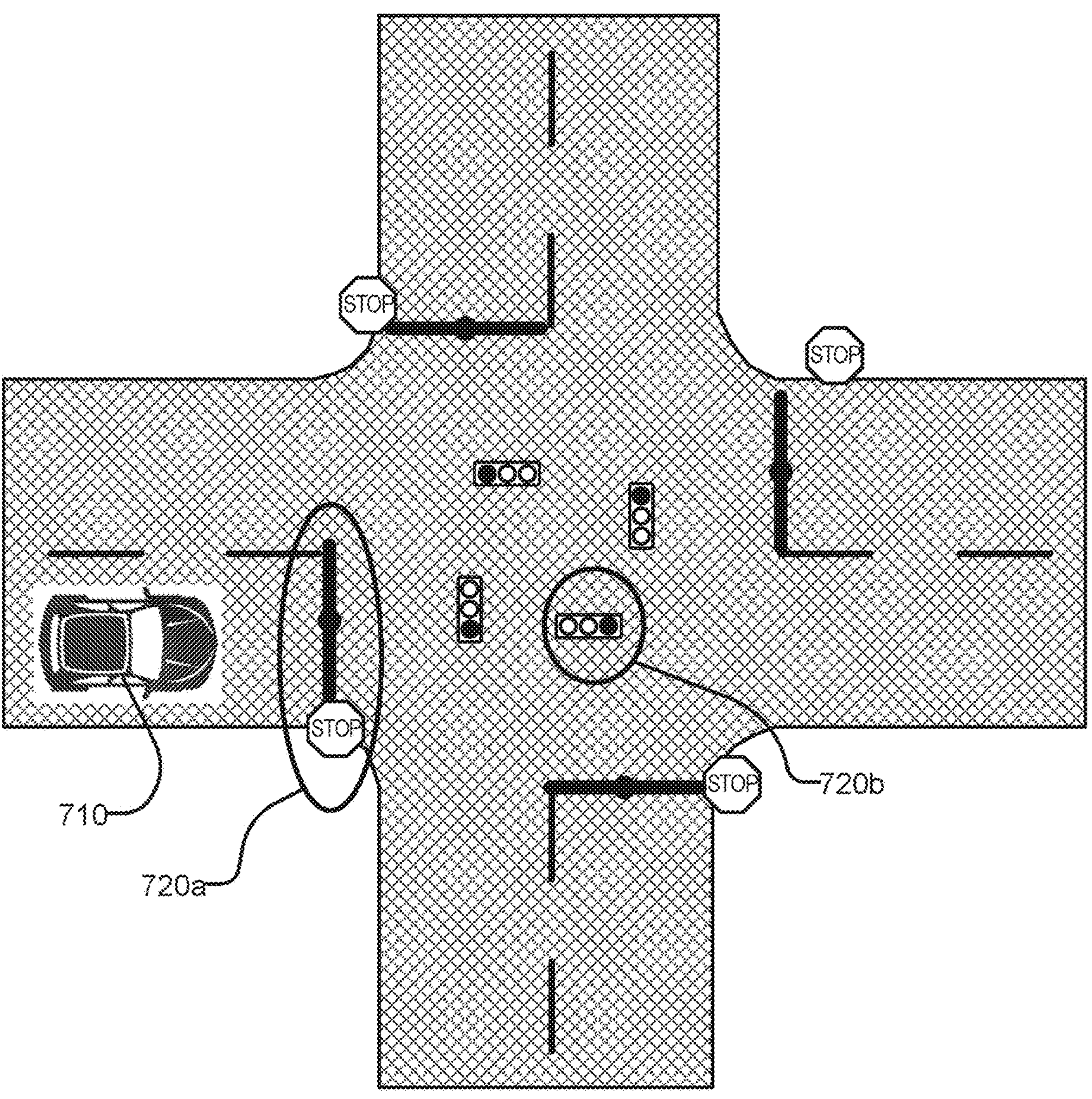
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720*a* and 720*b* that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
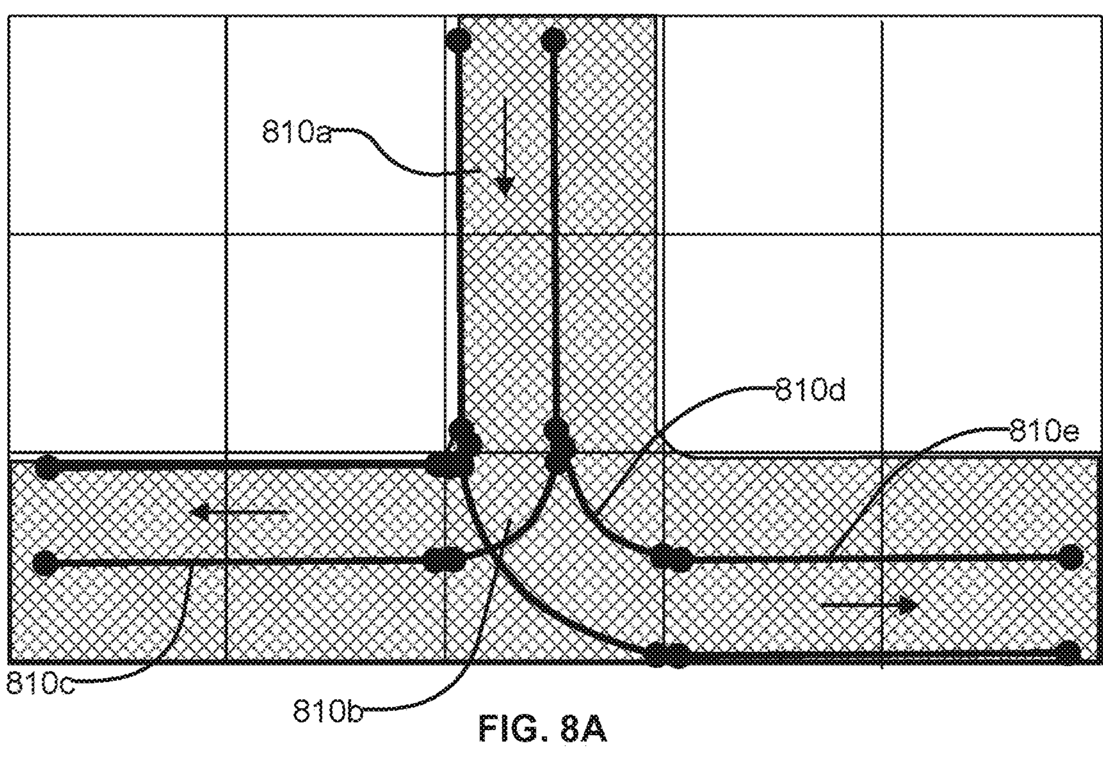
FIGS. 8A-B illustrates lane elements and relations between lane elements in an HD map, according to an embodiment.
Figure 8B:
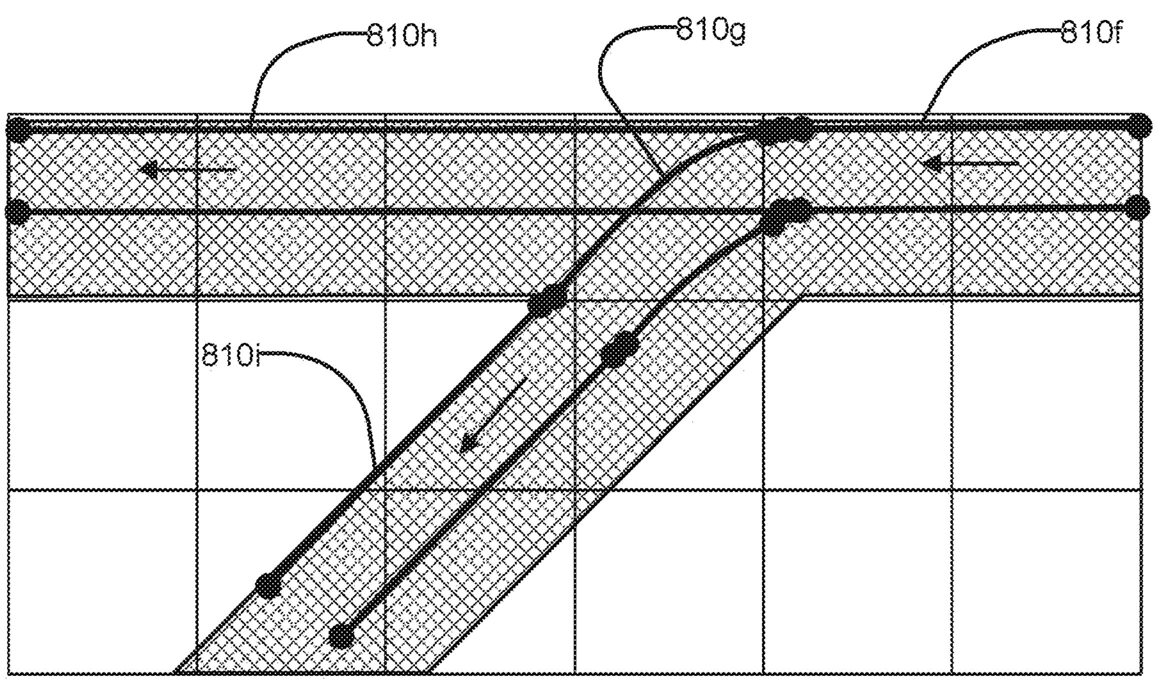

FIGS. 8A-B illustrates lane elements and relations between lane elements in an HD map, according to an embodiment. FIG. 8A shows an example of a T junction in a road illustrating a lane element 810*a* that is connected to lane element 810*c* via a turn lane 810*b* and is connected to lane 810*e* via a turn lane 810*d*. FIG. 8B shows an example of a Y junction in a road showing label 810*f* connected to lane 810*h* directly and connected to lane 810*i* via lane 810*g*. The HD map system 100 determines a route from a source location to a destination location as a sequence of connected lane elements that can be traversed to reach from the source location to the destination location.

System Architecture of Localization Module

Figure 9:
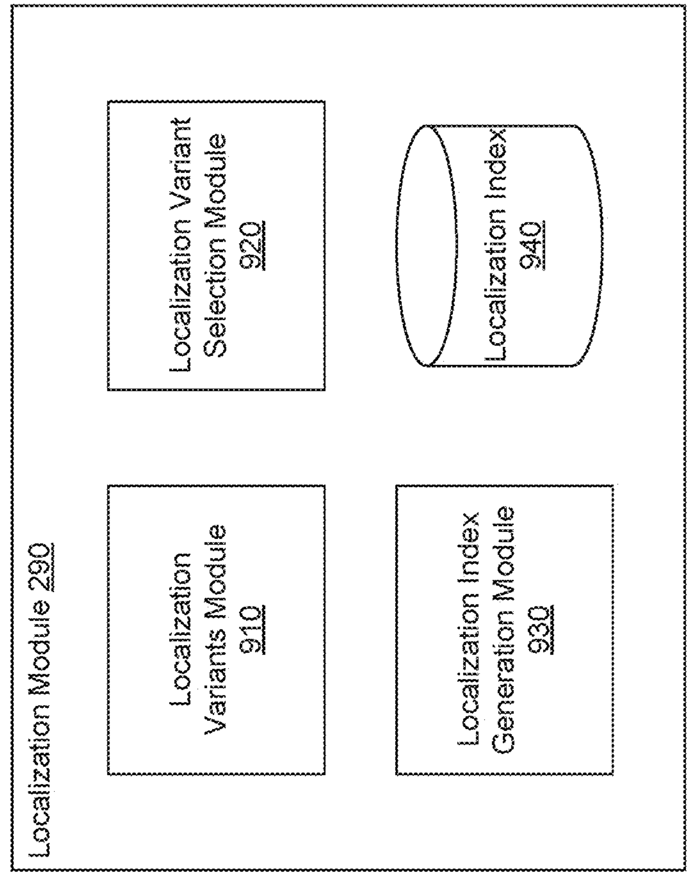
FIG. 9 describes the system architecture of a localization module, according to an embodiment.

FIG. 9 describes the system architecture of a localization module, according to an embodiment. The localization module 290 includes a localization variants module 910, a localization variant selection module 920, localization index generation module 930, and a localization index 940. Other embodiments may include more of fewer modules than those indicated herein. Functionality performed by a module may be performed by other modules than those indicated herein.

The localization module 290 may be present in the vehicle computing system 120 or in the online HD map system 110. In some embodiments, the localization module 290*a* present in the vehicle computing system 120 has different modules (or sub-modules) compared to the localization module 290*b* present in the online HD map system 110. For example, the localization module 290*a* present in the vehicle computing system 120 may not have the localization index generation module 930. The localization module 290*a* present in the vehicle computing system 120 may have fewer localization variants compared to the localization module 290*b* present in the online HD map system 110.

The localization module 290*b* present in the online HD map system 110 collects data describing tracks from various vehicle computing systems and evaluates various localization variants on each track to build the localization index 940. The localization module 290*b* sends at least a portion of the localization index 940 to individual autonomous vehicles. The subset may be determined based on the configuration of individual autonomous vehicle. For example, if an autonomous vehicle has specific sensor configurations, the localization variants relevant to those sensor configurations are sent to the autonomous vehicle and localization variants based on sensor configurations that are not present in the autonomous vehicle skipped.

In an embodiment, the localization module 290*b* present in the online HD map system 110 exports a subset of the localization index 940, for example, to a file and transmits the file to an autonomous vehicle for storage in the localization module 290*a* present in the vehicle computing system 120 of that autonomous vehicle. The localization module 290*a* present in the vehicle computing system 120 of an autonomous vehicle uses the localization variants while driving to select specific localization variants based on driving context, for example, the geographical region in which the autonomous vehicle is driving and uses the localization variants to perform localization for the autonomous vehicle. As the autonomous vehicle is driving, the autonomous vehicle may move from one geographical region to another. Accordingly, the autonomous vehicle changes the localization variants used for localization as the geographical region or other attributes of the driving context change.

The localization variants module 910 stores instructions and parameters for several localization variants. The localization variants module 910 stores instructions for localization techniques. For example, for each localization technique, the localization variants module 910 stores a set of executable instructions such as one or more functions or methods that implement the localization technique. The localization variants module 910 identifies parameters that are relevant to a localization technique and stores sets of values of these parameters. A localization technique receives as input a map and sensor data received by a vehicle and identifies the location of the vehicle in the map based on the sensor data.

The various localization techniques may be added to the localization module 290 manually, for example, by an expert. The executable instructions for the various localization techniques may be stored on secondary storage, for example, a disk, or solid state drive (SSD) and loaded by the localization module 290. The localization module 290 may either pre-load the instructions for various localization techniques or load them in a lazy fashion, as needed.

A localization technique may be based on odometry that represents the process of estimating the motion of the vehicle relative to the vehicle's position based on sequential sensor data received by the vehicle. The localization module 290 may use odometry to assist in initializing position of the vehicle for use by a localization technique in performing its local search. The localization module 290 may also use odometry to estimate velocity and acceleration of the vehicle as a way to extrapolate the vehicle position in between sensor readings that may be used to localize. For example, if localization fails, the localization module 290 falls back to odometry to estimate motion from a previously known pose based on IMU or vehicle control signals.

Another localization technique is lidar based localization. Localization variants based on lidar based localization include ground/non-ground variations that perform separate processing for ground based features vs. non-ground features; lidar based localization that processes all points vs. high intensity points; lidar based localization that performs color matching; lidar based localization that separated hardscape (hard surfaces such as buildings) vs. softscape (vegetation); and so on.

Another localization technique uses edgels for localization. Accordingly the system identifies edgels in sensor data, for example, camera images and uses the edgels match objects in sensor data with objects in the OMap to determine the location of the vehicle. Systems and techniques for determining edgels are described in the U.S. patent application Ser. No. 16/161,035, filed on Oct. 15, 2018, which is hereby incorporated by reference in its entirety. A variation of edgel based localization technique process ground points separately from non-ground points. Another variation of edgel based localization technique separately processes hardscape and softscape.

Another localization technique is feature-based localization that detects features using sensor data such as camera images and lidar scans and compares the features with features in the HD map to determine the location of the vehicle. Another localization technique uses image-based odometry to determine location of the vehicle. Variations of image-based odometry determine location of the vehicle by comparing different features extracted from camera images with map for example, ground textures, image features, edges, and so on. Another localization technique uses lidar-based odometry to determine location of the vehicle. Variations of lidar-based odometry use one of pairwise iterative closest point (ICP) or multi-scan ICP. Variants of all the above techniques are obtained by changing various parameters such as iteration limits, search radius, lorentzian weighting, and so on. Other localization techniques include global navigation satellite system (GNSS) based localization and inertial measurement unit (IMU) based odometry. Variants of these techniques use different integration methods and various correction methods.

The localization index 940 stores a mapping from driving contexts to localization variants. In an embodiment, the localization index 940 represents a spatial index that maps geographical regions to localization variants. In an embodiment, the localization module 290 defines a default localization variant for a geographical region. The localization module 290 receives and stores polygons that define transition zones, for example, as defined by experts. These polygons may be relatively small in area, for example entrance on and exits off the highway. The localization module 290 identifies transition points in the geographical region by evaluating various localization variants and identifying areas were the default variant breaks down. The transition points can also be identified by knowing what types of issues cause the default variant problems. If the vehicle is in the transition zone T1 using a localization variant L1, it continues using localization variant L1 until it enters a transition zone T2 where it switches to another localization variant L2.

The localization index 940 may store an association between lane elements and localization variants that perform well on that lane element. In an embodiment the localization index stores coordinates, for example, latitude and longitude of some locations and corresponding localization variants that have high performance in a geographical region surrounding the coordinates.

In some embodiments, localization index 940 stores data so as to save space by clustering geographical regions that have similar localization variants. For example, if 3 samples within a few meters of each other share the same set of localization variants, the localization index 940 stores the set of localization variants once for a location that is the average of the cluster of locations. Alternatively, the localization index 940 stores a representation of the set of localization variants that is shared by all these geographical regions.

The localization variant selection module 920 selects one or more localization variants when the autonomous vehicle is driving. The localization variant selection module 920 receives sensor data and other context information from the autonomous vehicle and uses the localization index 940 to select the localization variants.

The localization index generation module 930 evaluates different localization variants for each driving context and identifies one or more localization variants to be used in the geographical region. The driving context comprises information describing a current track of the autonomous vehicle, i.e., an instance during which the autonomous vehicle is driving along a portion of a route. A driving context may be represented as a tuple that has various elements such as geographical region, time of day, weather condition, speed of autonomous vehicle, angular velocity of the autonomous vehicle, and so on.

The localization index generation module 930 executes each localization variant for each driving context and compares it against a ground truth, for example, the pose of the autonomous vehicle determined using an HD map obtained by aligning data from various tracks. A track represents information describing a drive of an autonomous vehicle through a route. Since each autonomous vehicle collects and stores sensor data as the vehicle drives, the sensor data can be used at a later stage to execute various localization variants, whether or not the autonomous vehicle used the localization variant during the drive. In an embodiment, the HD map system executes the instructions of a localization variant by varying the error in the initial guesses.

The localization index generation module 930 evaluates performance of a localization variant based on various criteria including: (1) a measure of accuracy indicating how accurately the localization variant worked (the measure of accuracy could be in meters); (2) a measure of robustness in meters indicating how prone to local minima is the localization variant (the measure indicating a size of the basin of attraction corresponding to the local minima); (3) a measure of computation cost of the localization variant indicating how expensive it was to compute the result; and (4) a measure of how well the localization variant works when the autonomous vehicle is turning as compared to when the autonomous vehicle is driving straight ahead. In an embodiment, the localization index generation module 930 determines a score based on each of the above factors and determines a score representing a performance of the localization variant as a weighted aggregate of the individual scores for the factors.

In an embodiment, the localization module 290 uses Kalman filtering to fuse localization and odometry inputs optimally. The localization module 290 receives uncertainty estimates from each input source (localization, odometry, IMU, GPS, controller area network (CAN) bus) for use for the Kalman Filter. The Kalman filter integrates multiple inputs and results from multiple localization techniques to estimate location.

In an embodiment, the localization module 290 stores representation of localization strategies for driving contexts or for specific geographical regions. The localization strategy comprises the localization variants that perform well in a driving context. The localization module 290 uses a storage efficient mechanism for storing the localization strategy that stores a localization variant ID for each class of localization/odometry. The different classes of Localization/Odometry include: lidar localization, lidar odometry, Camera localization, Camera odometry, GPS (or GNSS) localization, IMU odometry). The localization module 290 may use one byte for each localization variant, thereby storing the localization strategy using as many bytes as the classes of localization/odometry, for example, 6 bytes if each variant ID fits in 8 bits and there are 6 classes of localization/odometry.

Systems and methods for representations of lanes and route generation for an autonomous vehicle using HD map data are described in the U.S. patent application Ser. No. 15/853,614 filed on Dec. 22, 2017, which is hereby incorporated by reference in its entirety.

Processes

Figure 10:
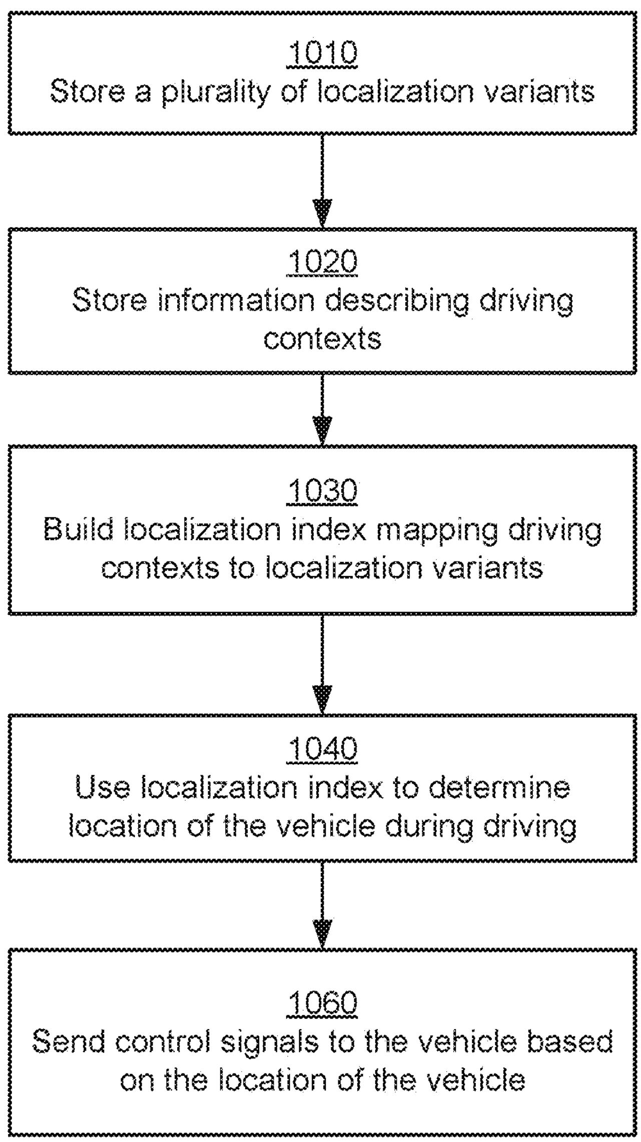
FIG. 10 illustrates the process for performing localization for a vehicle, according to an embodiment.

FIG. 10 illustrates the process for performing localization for a vehicle, according to an embodiment. The steps described may be performed in an order different from that indicated herein. The steps may be performed by modules other than those indicated herein.

The localization module 290 stores a plurality of localization variants. In an embodiment, the localization variant module 910 of the localization module 290 stores 1010 instructions for various localization techniques and parameter values for various localization variants. The HD map system stores 1020 information describing various driving contexts. The system builds 1030 a localization index mapping driving contexts to localization variants. The localization index stores a mapping from each driving context to one or more localization variants based on a measure of performance of each localization variant in the driving context. An autonomous vehicle uses the localization index to determine the location of the autonomous vehicle as the autonomous vehicle is driving. The system navigates by determining control signals for the autonomous vehicle based on the determined location and sending 1060 control signals to the controls of the autonomous vehicle.

Figure 11:
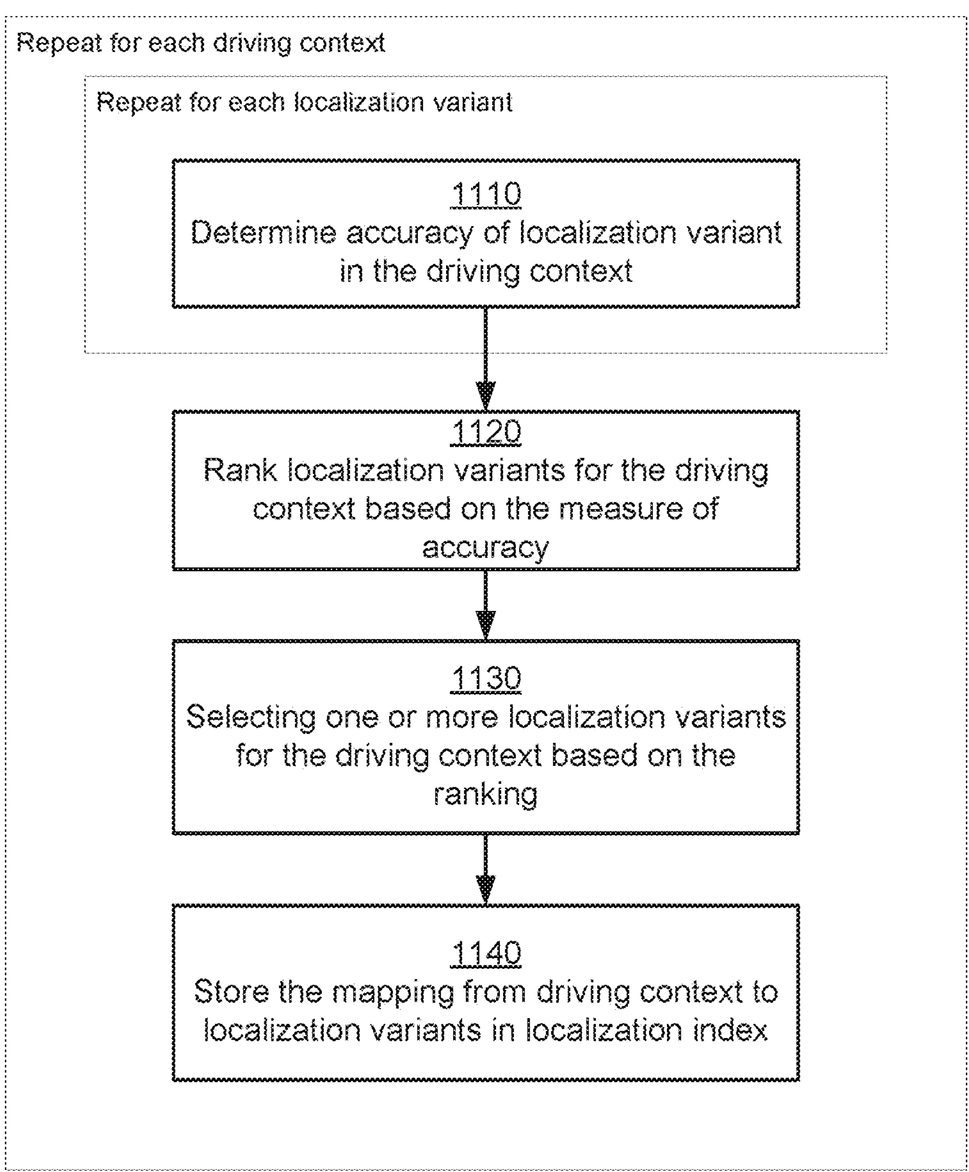
FIG. 11 illustrates the process for building localization index, according to an embodiment.

FIG. 11 illustrates the process for building localization index, according to an embodiment. The steps described may be performed in an order different from that indicated herein. The steps may be performed by modules other than those indicated herein.

The localization module 290 repeats the following steps for each driving context, or for a subset of driving contexts. The localization module 290 determining a measure of performance for each of the plurality of localization variants (or a subset of the plurality of localization variants). The localization module 290 determines performance of a localization variant by determining a location of a vehicle based on a track data such as sensor data (or previous drives of vehicles on a route). The localization module 290 determines an actual pose of the vehicle based on results obtained via alignment of various track data. The pose of the vehicle determined via alignment of multiple tracks is referred to as alignment pose. The alignment pose is treated as ground truth against which the localization module 290 compares results of localization based on individual localization variants. Systems and methods for performing global alignment of data collected from sensors of vehicles for determining poses of vehicles are described in the U.S. patent application Ser. No. 15/857,602 filed on Dec. 28, 2017, which is hereby incorporated by reference in its entirety.

The localization module 290 ranks 1120 the plurality of localization variants based on the measure of performance of the localization variants. The localization module 290 selects 1130 one or more localization variants for the driving context based on the ranking. The localization module 290 stores 1140 a mapping from the driving context to the corresponding localization variants in the localization index.

Figure 12:
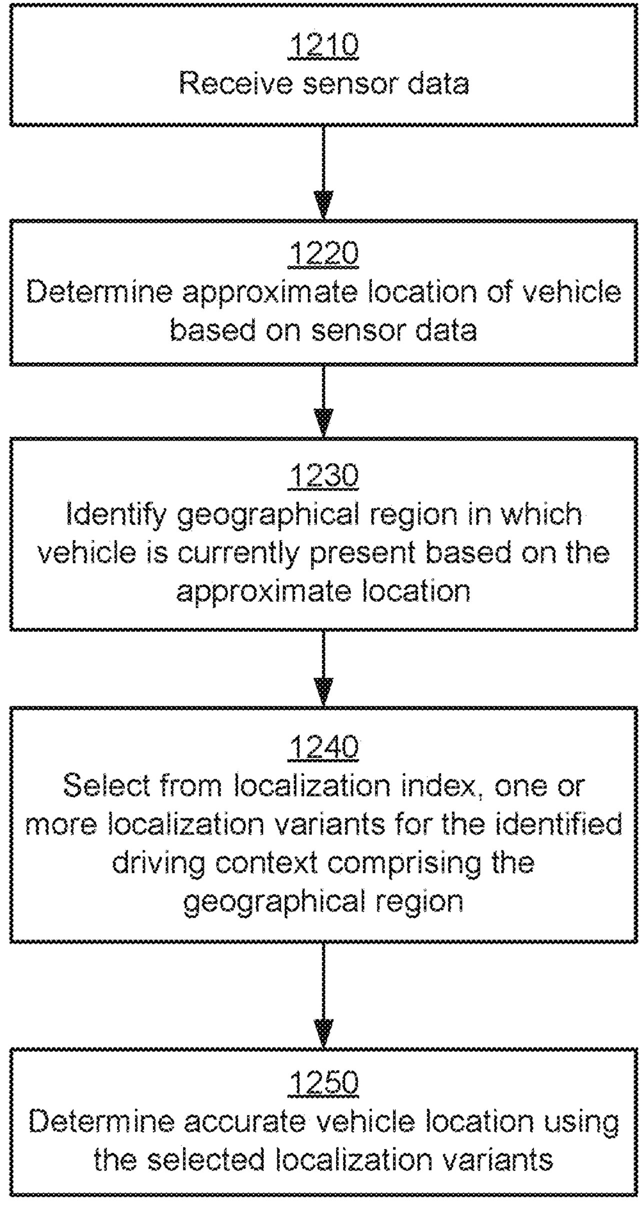
FIG. 12 illustrates the process for performing localization based on the localization index, according to an embodiment.

FIG. 12 illustrates the process for performing localization based on the localization index, according to an embodiment. The steps described may be performed in an order different from that indicated herein. The steps may be performed by modules other than those indicated herein.

An autonomous vehicle repeats the following steps while driving. The autonomous vehicle could repeat these steps multiple times a second. The autonomous vehicle receives 1210 sensor data captured by sensors of the autonomous vehicle. The autonomous vehicle determines using on the sensor data, a driving context in which the autonomous vehicle is currently driving. For example, the driving context may describe the geographical region in which the autonomous vehicle is driving.

The autonomous vehicle determines 1220 an approximate location of the autonomous vehicle based on the sensor data. The autonomous vehicle identifies 1230 the geographical region in which the autonomous vehicle is currently driving based on the approximate location. For example, each geographical region may be represented as a polygon. The localization module 290 determines whether the current location of the autonomous vehicle falls within a polygon representing a geographical region. In an embodiment, the localization module 290 uses a previous geographical region in which the autonomous vehicle was driving to narrow the search for geographical regions. For example, the HD map system stores associations between adjacent geographical regions. The localization module 290 uses these associations to identify geographical regions neighboring the previous geographical region. The localization module 290 limits the search for the geographical region to the set of geographical regions neighboring the previous geographical region in which the autonomous vehicle was driving. The localization module 290 may first verify if the current location continues to lie within the previous geographical region before performing a search for a new geographical region. In an embodiment, the HD map system stores information describing the direction in neighboring geographical regions are present with respect to a geographical region, for example, north, south, east, west, and so on. The localization module 290 tracks the direction in which the vehicle autonomous vehicle is driving based on information received from sensors, for example, IMU or GNSS. The localization module 290 further narrows the search for geographical regions to geographical regions that neighbor the previous geographical region along the direction in which the autonomous vehicle is travelling.

The autonomous vehicle selects 1240 one or more localization variants corresponding to the driving context comprising the geographical region using the localization index. The autonomous vehicle determines 1250 an accurate location of the autonomous vehicle using the localization variant. The autonomous vehicle navigates based on the location of the autonomous vehicle. For example, the control module 225 may determine control signals for navigating the autonomous vehicle using the current location of the autonomous vehicle and send the control signals to controls of the autonomous vehicle.

The autonomous vehicle may determine control signals for navigating the autonomous vehicle using the current location of the autonomous vehicle and the data of the HD map. The autonomous vehicle navigates the autonomous vehicle based on the control signals.

For example, the autonomous vehicle may identify the lane in which the vehicle is currently driving and may decide to change the lane based on the location, for example, if the autonomous vehicle needs to turn left/right within a short distance. As another example, the autonomous vehicle may determine based on the location that a stop sign is approaching and the autonomous vehicle needs to slow down to come to a stop.

In an embodiment the localization index stores coordinates, for example, latitude and longitude of some locations and corresponding localization variants that have high performance in a geographical region surrounding the coordinates. The localization module 290 determines the stored coordinates that are closest to the current location of the autonomous vehicle and uses the localization variants corresponding to the stored coordinates for determining the location of the autonomous vehicle.

Versioning

The HD map system may receive and store different version of the same localization techniques, for example, as localization techniques evolve. The HD map system may have to recompute the mapping from a geographical region to corresponding localization variants if there are following changes: (1) changes in the HD map data associated with the geographical region, for example, if a new structure such as a building or a tree is added or deleted from the HD map data; (2) changes to the parameters used by a localization technique; (3) changes in the executable machine instructions corresponding to a localization techniques. The localization index 940 stores (1) the version of the HD map data against which a mapping from a geographical region and a localization variant was computed (2) the sensor configuration used in the data that was localized to the map to compute the mapping (this includes a configuration name and version of the sensors and a change in configuration (i.e., a change in a sensor or sensor position/orientation); (3) the version of the localization technique used to compute the mapping. The localization index 940 stores a version of the HD map used along with the mapping data. Accordingly, if an autonomous vehicle that has map version X and binary version Y (referring to the version of executable files of the vehicle computing system 120), the localization module 290 ensures that the localization variants used were mapped to the geographical region using HD map data version X and binary version Y.

Sensor Configuration Dependence

The localization strategy may differ between different sensor configurations in the same geographical region or driving context. As a result the localization module 290 needs to evaluate each localization variant for each sensor configuration. In order to manage the combinatorial explosion, the localization module 290 analyzes a given area of a map and identify what type of localization strategies for a given sensor configuration would be optimal In an embodiment, the localization module 290 analyzes correlations between different sensor configurations across geographical regions. If localization module 290 determines high correlation across sensor configurations, the localization module 290 evaluates a geographical region with one sensor configuration and maps the results for other sensor configuration which are correlated. This allows the localization module 290 to evaluate fewer sensor configurations for localization variants.

In an embodiment, the localization module 290 analyzes characteristics of the geographical regions and uses the characteristics to predict localization variants that work best. Characteristics of geographical region include whether the region is suburban or urban, the types of highway (urban or rural), if the geographical region is rural, whether the region has forests or agriculture, whether there are bridges, tunnels, whether the geographical region is flat, hilly, windy, and so on. In an embodiment, the localization module 290 builds a map that identifies these characteristics of each geographical region. The localization module 290 determines optimal localization variants for each type of geographical region having a set of characteristics. When the localization module 290 receives a new geographical region, the localization module 290 determines the characteristics of the geographical region and determines the localization variants to use based on the characteristics. Accordingly the driving context includes various characteristics of geographical regions rather than individual geographical regions. The localization module 290 determines the characteristics of a geographical region and identifies a driving context that matches the characteristics of the geographical region. The localization module 290 identifies the localization variants to use for that driving context and uses them to perform localization.

In an embodiment, the driving context further includes the sensor configuration details. Accordingly, the localization module 290 maps combinations of characteristics of geographical regions and sensor configurations to localization variants.

The localization module 290 matches characteristics of a geographical to the same characteristics of an area in our ground truth data sets. We would compute optimal localization strategies for all of the ground truth data sets. Then for a new map, we would walk through the map and identify each area's best matching area in the ground truth set (e.g., an area with buildings and narrow streets vs an area with trees and a curving road). With such a mapping, we can map an area in a map to a set of localization strategies for each kind of sensor configuration that we keep track of.

Although embodiments are described in connection with autonomous vehicles, the techniques described herein can be used by other types of vehicles, for example, vehicles that are driven by human drivers. Furthermore, embodiments of the invention may be used for other types of navigable machines, for example, robots, ships, drones, airplanes, and the like.

Machine Learning Based Localization

In an embodiment, the localization module 290 uses machine learning based techniques such as deep learning and neural networks to build the localization variant index 940 and to perform localization. The localization module 290 uses deep learning to characterize types of regions where certain localization variants work best. The localization module 290 uses a training data set comprising the samples based on tracks representing past instances of autonomous vehicles driving through various geographical regions. The localization module 290 uses previously determine performance of various localization variants as expected scores for localization variants. In one embodiment, the localization module 290 trains a deep learning based model, for example, a neural network such as a multilayered perceptron configured to receive an encoding of a geographical region as input and determine a score for a localization variant. The score indicates a measure of performance, for example, a high score may indicate that the localization variant performs well and a low score indicates that the localization variant performs poorly. In another embodiment, the localization module 290 the trained deep learning based model receives an encoding of a geographical region as input and predicts a localization variant that performs well in that geographical region. The encoding of the geographical region may comprise HD map data for the geographical region. Alternatively, the encoding of the geographical region may comprise a low resolution map that describes various structures of the geographical region such as building, tunnels, bridges as well as physical features such as rivers, hills, altitude of different points, and so on. The localization module 290 uses the deep learning based model to build the localization variant index 940, for example, to determine localization variants for geographical regions where there is insufficient track data based on vehicles driving through the geographical region.

The localization module 290 tests the performance of the deep learning based model to see if the accuracy of the results predicted is at least above a threshold value. The localization module 290 tests the performance by taking a map of one or more geographical regions, performing a brute force analysis of localization variants by measuring the performance of various localization variants, and various sensor configurations for each localization variant. The localization module 290 executes the deep learning based model to determine the best performing localization variants or to determine a score for a particular localization variant.

The localization module 290 compares the results of the brute force execution with the predictions of the deep learning based model and determine error statistics. The localization module 290 measures the net loss in performance to determine whether the deep learning based model is usable in particular geographical regions.

If the localization module 290 determines that the deep learning based model has poor performance and is unable to predict the best localization variant, the localization module 290 identifies the geographical regions where the model is inaccurate. Accordingly, the localization module switches to performing brute force analysis of evaluation of performance of all localization variants and different sensor configurations in those regions. However, in regions where the deep learning based model is accurate, the localization module 290 is able to use the deep learning based model in those regions thereby saving computational resources by not having to perform brute force analysis.

Although the above embodiments describe a deep learning based model, the above analysis can also be performed with other machine learning based models, for example, machine learning based models. For example, the localization module 290 extract specific features of the geographical regions and provides them as input to the machine learning based model. The machine learning based model predicts one or more localization variants that perform well for the input geographical region or the machine learning based model determines a score for a particular localization variant indicating the performance of the localization variant in the geographical region. Examples of features of a geographical region include types of structures present in the geographical region such as building, tunnels, bridges as well as features describing physical features such as rivers, hills, altitude of different points, and so on.

Although the above embodiments describe machine learning based models that receive description of a geographical region, the techniques apply to other types of driving context, for example, speed of the autonomous vehicle, time of day, weather conditions, angular velocity, and so on. Accordingly, the input to the models can be an encoding of a general driving context or specific features of the driving context, depending on the type of model.

Confidence Map for Localization

In an embodiment, the localization module 290 collects statistics based on analysis of localization variants. Examples of statistics collected includes convergence radius, covariance of localization result, and error stats for the specific localization result. From the localization statistics the localization module 290 builds a map of a measure of confidence in the localization variant at each point in the map. This provides a useful visualization that helps a user identify problem areas and make improvements in the process. For each sample, the localization module 290 determines the best-case localization variant's result and uses that as a value for the sample's location in the map. The localization module 290 creates a visualization that shows a color-coded representation of the map, for example, a map with red indicating high error and green indicating low error. Red areas would indicate locations that need further investigation, for example, analysis of other localization variants. The map of confidence values also acts as a measure of a level of trust in localization results at specific locations. The map of confidence values allows the HD Map system to optimally integrate multiple localization results from different localization variants corresponding to different sensor modalities. In an embodiment, the HD map system integrates results from different localization variants using Kalman filtering. The results of each of the localization variants weighted based on their respective convergence confidence. In an embodiment, the HD map system determines measures of covariance across pairs of localization variants based on different sensors. The HD map system uses the measures of covariances for integrating results from different localization variants using Kalman filtering.

The confidence map can also be used to generate hotspots for locations in the HD map that needs further inspection and analysis. Localization error may be high due to various reasons. For example, localization error may be high due to insufficient constraints in the sensor data (e.g., due to lack of vertical structure in the direction of travel, or everything being uniformly flat). Localization error may be high due to errors in the sensor data, for example, due to a software or hardware failure. Localization error may be high due errors in the OMap including: (1) badly aligned sample that may affect the localization results by having part of the map misaligned resulting in ambiguous results when localizing; (2) A temporal object (e.g., a car, cyclist or pedestrian) which should have been removed from the OMap but was not; these objects which are not permanent possibly cause a localization error when a similar object is close to that same position in the sample being localized; (3) missing data in the ( )Map, for example, due to a data collection problem before OMap construction (e.g., the sensor for the vehicle was obstructed in that location) or because data just not collected for that part of the map.

In situations where there is high localization error, the OMap needs to be analyzed by an expert or automatically to determine whether to fix a problem (e.g., add missing data) or identify scenarios that need additional localization variant analysis. In an embodiment, the localization module 290 analyses the data of the confidence map by filtering points based on certain threshold, clustering the remaining points with some maximum radius (say 10 m), and creating review tasks for each cluster. The localization module 290 may display the review tasks via a user interface or send via some communication mechanism to a user/expert for analysis. For example, a user may visually inspect such regions and determine a subsequent action needed.

Alternative Embodiments

The number of localization variants can be infinite due to parameter variations. The system prunes the parameter space to reduce number of effective localization variants. This may be performed using experiments with a localization technique and comparing results over a wide range of parameters and eventually narrowing down to combinations of parameter sets that are most effective. This may result in a few IOs or so localization variants for a specific localization technique which is manageable for further analysis. In an embodiment, the localization module 290 prunes localization variants that are very likely to perform poorly in a given driving context. The localization module 290 may mark these localization variants for the geographical regions. Accordingly, the localization module 290 is able to eliminate these localization variants immediately from any analysis, thereby saving computational resources. If the localization module 290 determines that a localization variant performs well for only a small percentage of tracks, the localization module 290 may further analyze those cases. If the localization module 290 identifies another variant that performs close to the best for a driving content and is generally applicable, the localization module 290 marks the variant as disposable and records a description of the resolution with that variant's evaluation results. For the winning variants, the localization module 290 may further create and evaluate a number of variations of those localization variant making smaller variations to the critical parameters (i.e., smaller than the initial variation from the preceding set of variants). The localization module 290 evaluates those localization variants to re-evaluate the winning localization variants as well a losing localization variants that need to be pruned.

Different sensor modalities have different convergence regions and covariances of the solution depending on the dimensions along which localization performs well. For example, in a particular geographical region, convergence confidence for localization variants based on GPS signal may be high compared to those based on lidar scans, whereas in another geographical region the convergence confidence for localization variants based on lidar scans may be high compared to those based on GPS signals. In an embodiment, the HD map system stores a measure of convergence confidence and covariance of localization variants for each geographical region. For example, HD map system determines the rate of convergence of localization variants for different tracks in each geographical region. The HD map system determines the measure of convergence confidence based on an aggregate rate of convergence of localization variants for each type of sensor for different tracks in each geographical region.

In an embodiment, the HD map system integrates results from localization variants using the precomputed covariances and a Kalman filter. When the HD map system integrates the localization variants of different sensor modalities, the HD map system uses the confidence values to determine which localization variants are more reliable and in which directions. In an embodiment, the HD map system determines measures of covariance across pairs of localization variants based on different sensors. The HD map system uses the measures of covariances for integrating results from different localization variants using Kalman filtering.

Computing Machine Architecture

Figure 13:
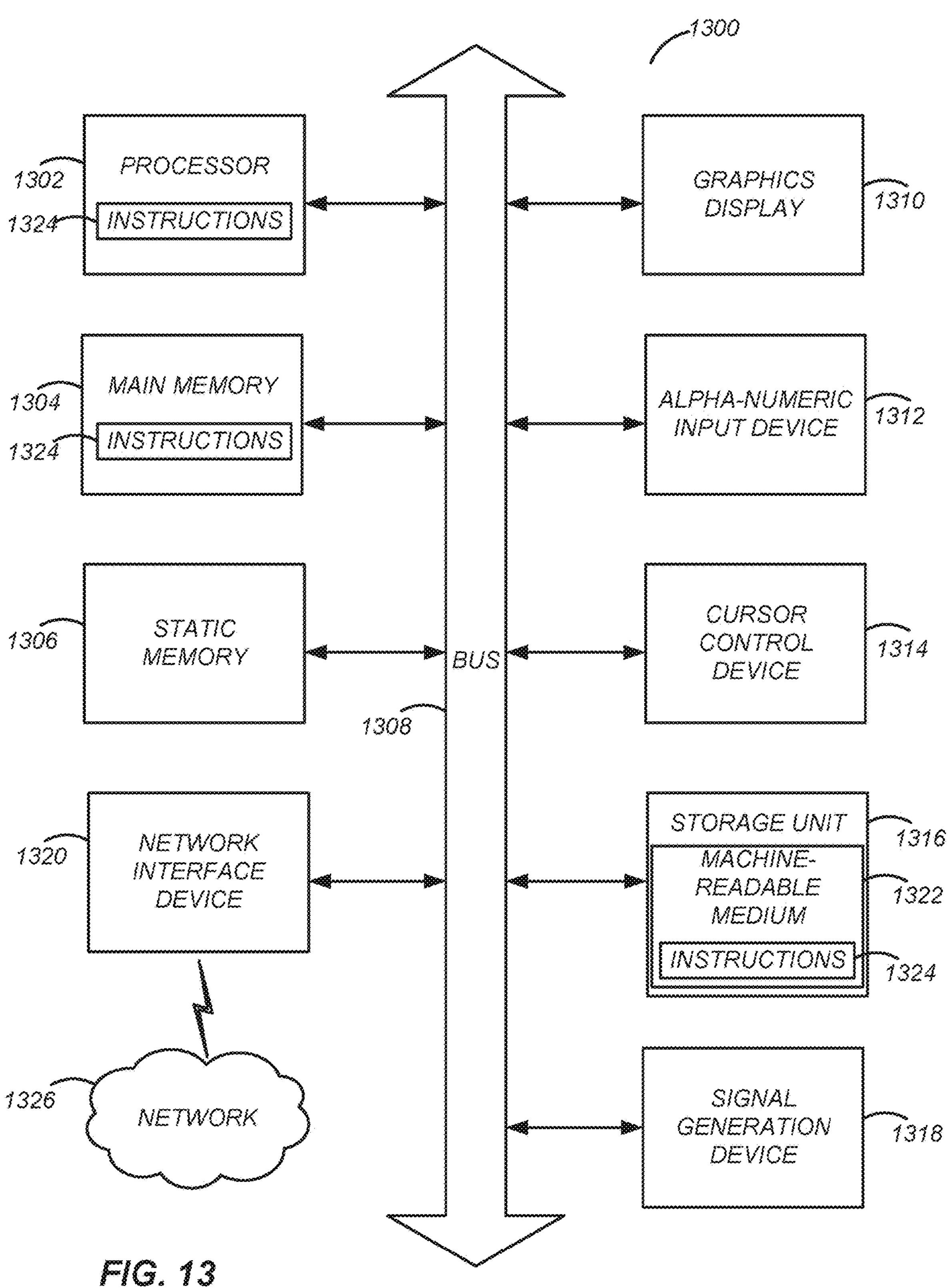
FIG. 13 illustrates an embodiment of a computing machine that can read instructions from a machine-readable medium and execute the instructions in a processor or controller.

FIG. 13 is a block diagram illustrating components of an example machine able to read instructions from a machine-readable medium and execute them in a processor (or controller). Specifically, FIG. 13 shows a diagrammatic representation of a machine in the example form of a computer system 1300 within which instructions 1324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes a processor 1302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1304, and a static memory 1306, which are configured to communicate with each other via a bus 1308. The computer system 1300 may further include graphics display unit 1310 (e.g., a plasma display panel (PDP), a liquid crystal display (LCD), a projector, or a cathode ray tube (CRT)). The computer system 1300 may also include alphanumeric input device 1312 (e.g., a keyboard), a cursor control device 1314 (e.g., a mouse, a trackball, a joystick, a motion sensor, or other pointing instrument), a storage unit 1316, a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 (e.g., software) may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 (e.g., software) may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., instructions 1324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method comprising:

determining a first operating context of a machine;

selecting, for localization of the machine and based at least on the first operating context, a first localization variant that uses first sensor data corresponding to a first sensor modality set that includes one or more vision sensor modalities, the first localization variant corresponding to one or more first parameter values of one or more parameters used for performing the localization, the one or more first parameter values indicating a first manner in which the first sensor data is processed for performing the localization;

determining that the first operating context of the machine has changed to a second operating context; and responsive to determining that the first operating context has changed to the second operating context, transitioning, for localization of the machine and based at least on the second operating context, from the first localization variant to a second localization variant that uses second sensor data corresponding to a second sensor modality set that also includes one or more additional or one or more less vision sensor modalities as compared to the first sensor modality set, second localization variant corresponding to one or more second parameter values of the second localization variant indicating a second manner in which the second sensor data is processed for performing the localization.

2. The method of claim 1, wherein:

the first sensor modality set and the second sensor modality set include a same vision sensor modality such that at least a portion of the first sensor data and at least a portion of the second sensor data correspond to the same vision sensor modality; and the first sensor data and the second sensor data corresponding to the same vision sensor modality are processed differently due to one or more differences in the one or more first parameter values with respect to the one or more second parameter values.

3. The method of claim 1, wherein one or more of:

the one or more vision sensor modalities of the first sensor modality set include one or more of an image-based modality or a lidar-based modality;

the one or more vision sensor modalities of the second sensor modality set include one or more of an image-based modality or a lidar-based modality;

the first sensor modality set includes one or more vision sensor modalities not included in the second sensor modality set; or the second sensor modality set includes one or more vision sensor modalities not included in the first sensor modality set.

4. The method of claim 1, wherein at least one of the first operating context or the second operating context is determined based at least on one or more of:

a current road type on which the machine is operating;

whether a region at which the machine is operating is a suburban area, an urban area, or a rural area;

a current time of day;

a current weather condition of the region;

a current speed of the machine;

an angular velocity of the machine;

a particular sensor configuration of the machine; or a level of detail of a map used by the machine as part of the localization.

5. The method of claim 1, wherein one or more of the first localization variant or the second localization variant is selected using a localization index that includes a plurality of localization variants and a plurality of operating contexts, the localization index mapping individual localization variants of the plurality of localization variants to individual operating contexts of the plurality of operating contexts based at least on localization performance of the individual localization variants with respect to the individual operating contexts.

6. The method of claim 5, wherein the localization index further indicates individual map versions corresponding to the individual localization variants and individual operating contexts.

7. The method of claim 6, wherein the first localization variant is selected based at least on a current map version used by the machine as part of performing the localization matching a particular map version corresponding to the first localization variant in the localization index.

8. The method of claim 5, wherein the localization index further indicates individual sensor configurations corresponding to the individual localization variants and individual operating contexts.

9. The method of claim 8, wherein the first localization variant is selected based at least on a sensor configuration of the machine matching a particular sensor configuration corresponding to the first localization variant in the localization index.

10. A system comprising:

one or more processors to perform one or more control operations of a machine comprising:

determining an operating context of a machine; and selecting, for localization of the machine and based at least on the operating context of the machine, a localization variant that uses sensor data corresponding to a sensor modality set that includes one or more vision sensor modalities, the selecting of the localization variant including adjusting one or more parameter values of one or more parameters used for performing the localization, the one or more parameter values indicating a manner in which the sensor data is processed for performing the localization and indicating one or more vision sensor modalities to use as part of performing the localization.

11. The system of claim 10, wherein the adjusting of the one or more parameter values is such that sensor data corresponding to a same modality type is processed differently after the adjusting as compared to before the adjusting.

12. The system of claim 10, wherein the adjusting of the one or more parameter values includes changing at least one vision sensor modality to use as part of performing the localization.

13. The system of claim 10, wherein the localization variant is selected using a localization index that includes a plurality of localization variants and a plurality of operating contexts, the localization index mapping individual localization variants of the plurality of localization variants to individual operating contexts of the plurality of operating contexts based at least on localization performance of the individual localization variants with respect to the individual operating contexts.

14. The system of claim 13, wherein the localization index further indicates individual map versions corresponding to the individual localization variants and individual operating contexts.

15. The system of claim 14, wherein the localization variant is selected based at least on a current map version used by the machine as part of performing the localization matching a particular map version corresponding to the localization variant in the localization index.

16. The system of claim 13, wherein the localization index further indicates individual sensor configurations corresponding to the individual localization variants and individual operating contexts.

17. The system of claim 16, wherein the localization variant is selected based at least on a sensor configuration of the machine matching a particular sensor configuration corresponding to the localization variant in the localization index.

18. A system comprising:

one or more processors to perform one or more control operations of a machine comprising:

selecting, for localization of the machine and based at least on a first operating context of the machine, a first localization variant corresponding to a localization technique;

determining that the first operating context of the machine has changed to a second operating context; and responsive to determining that the first operating context has changed to the second operating context, transitioning, for localization of the machine and based at least on the second operating context, from the first localization variant to a second localization variant of the localization technique, the transitioning including adjusting, by the machine, one or more parameters corresponding to the localization technique from having one or more first parameter values corresponding to the first localization variant to having one or more second parameter values corresponding to the second localization variant, the one or more first parameter values dictating a first manner in which first vision sensor data is processed for performing the localization and the one or more second parameter values dictating a second manner in which second vision sensor data is processed for performing the localization.

19. The system of claim 18, wherein one or more of:

at least a portion of the first vision sensor data and at least a portion of the second vision sensor data corresponds to a same sensor modality; or at least a portion of the first vision sensor data and at least a portion of the second vision sensor data correspond to different sensor modalities.

20. The system of claim 18, wherein at least one of the first operating context or the second operating context is determined based at least on one or more of:

a current road type on which the machine is operating;

whether a region at which the machine is operating is a suburban area, an urban area, or a rural area;

a current time of day;

a current weather condition of the region;

a current speed of the machine;

an angular velocity of the machine;

a particular sensor configuration of the machine; or a level of detail of a map used by the machine as part of the localization.

* * * * *